Oct. 31, 1967  R. D. DAVIS  3,350,651
WAVEFORM CONVERTERS

Filed Dec. 18, 1964  2 Sheets-Sheet 2

INVENTOR.
ROBERT D. DAVIS
BY Fraser and Bogucki
ATTORNEYS

United States Patent Office 3,350,651
Patented Oct. 31, 1967

3,350,651
WAVEFORM CONVERTERS
Robert D. Davis, Spring Valley, Calif., assignor to Spectral Dynamics Corporation, San Diego, Calif., a corporation of California
Filed Dec. 18, 1964, Ser. No. 419,315
21 Claims. (Cl. 328—181)

This invention relates to waveform converter circuits, and more particularly to a circuit capable of generating a given output waveform having a frequency which is related to an applied repetitive input signal having a frequency which varies over a wide range.

Presently a great need exists for an electronic frequency multiplier circuit which permits the ratio between the input and output frequencies to be selected at any value within a given range and which can accurately maintain the selected ratio as the input frequency is varied over a wide dynamic range. While such a frequency multiplier circuit may have many potential uses, it is now needed primarily for improving certain operations in dynamic wave analyzer systems and the like as described hereinafter.

Currently dynamic analyzer systems are being used extensively to study the dynamic response of test specimens subjected to varying dynamic stresses. For example, they are used for vibration testing structural members and for analyzing various aspects of motor operation. With these systems the dynamic response under study is first converted to an electrical signal by an appropriate pickup transducer attached to or otherwise associated with the test specimen. The electrical signal generated by the pickup transducer is a complex signal containing a mixture of many component frequencies including multiples and sub-multiples of a basic excitation frequency representative of the speed of operation or the frequency of the applied dynamic stress. The complex signal is then analyzed by measuring the amplitude of the individual frequency components. This requires an extremely narrow band filtering action to enable the analyzer to select and measure only the desired frequency component from the complex signal.

For this purpose, filter circuits commonly referred to as tracking filters have been employed in most dynamic analyzers. These circuits, which for the most part employ a balanced modulator arrangement similar to that described in United States Patent No. 3,018,439 issued Jan. 23, 1962 to L. R. Burrow for an "Automatic Wave Analyzer" have an extremely narrow band frequency response with the center frequency of the passband determined by the frequency of an applied tuning signal. Accordingly, the frequency of the tuning signal may be varied to select any desired frequency component in the complex signal for measurement.

Frequently the most important dynamic responses occur at set multiples or sub-multiples of the basic excitation frequency. In many instances an investigator will want to plot the variations in amplitude of a particular multiple or sub-multiple response as the basic excitation frequency is varied over a wide range. Therefore, the tuning signal to the tracking filter or wave analyzer must also be varied to maintain an exact ratio between the frequency component being measured and the basic excitation frequency. With an appropriate frequency multiplier or divider circuit, a desired multiple or sub-multiple sinusoidal tuning signal frequency could be obtained directly from the basic excitation frequency. In this way, the operation of the dynamic analyzer can be made to follow automatically changes in the basic excitation frequency, thus permitting the multiple or sub-multiple response to be plotted continuously throughout the given dynamic range.

Whereas circuits for generating an output frequency at a sub-multiple of an applied input frequency are usually referred to as frequency dividers, they may be considered as frequency multipliers in which the multiplying factor is less than unity. Accordingly, general references to frequency multipliers contained hereinafter should be understood to include both frequency multipliers and dividers.

For the most part, existing frequency multiplier circuits are capable of electronically generating only integral whole number multiple or sub-multiples of an applied input frequency over very limited ranges. Whereas more complex frequency ratios can be obtained using combinations of multiplier and divider circuits, such arrangements are generally impractical because, while any given frequency ratio may theoretically be approximated by a ratio of whole numbers, a large number of multiplier and divider circuits might be required at excessive cost. Besides the cost involved, the frequency multiplication factor could not be made variable over a continuous range of values.

Furthermore, normal dynamic analyzer operations would require a frequency multiplier for generating the tuning frequencies over a wide bandwidth. That is, the multiplier output frequency must accurately follow changes in the input frequency over a considerable frequency range so that the exact frequency multiplication ratio is maintained. In this regard, such conventional frequency multiplier circuits as relaxation oscillators or multivibrators have very limited ranges. Recently, however, certain electromechanical frequency multiplier arrangements have been developed in an attempt to overcome the limitations of the available electronic multiplier circuits. Generally these electromechanical arrangements employ a synchronous motor driven by the basic excitation frequency and connected through a variable speed transmission to an output signal generator. The speed at which the output signal generator is driven determines the frequency of the output signal so that any selected multiplication ratio between the input and output frequencies can be selected and maintained over a wide dynamic range by properly setting the variable speed transmission.

Nevertheless these electromechanical arrangements have obvious disadvantages inherent in mechanical linkages. For example, if the ratio of the input and output frequencies is to be variable over a continuous range, the variable speed transmission cannot employ gears or other direct couplings between the synchronous motor and the output device, but must rely on indirect couplings such as hydraulic transmissions. These transmissions are subject to slippage during speed changes, and the degree of coupling can change due to uncontrollable external conditions.

A similar need exists for a circuit capable of receiving a variety of repetitive input signals having irregular waveforms with varying frequency and converting them to a sinusoidal output signal with a frequency proportional to the input frequency. Also, a need even exists for a waveform converting circuit capable of transforming nonsymmetrical and irregular waveforms into a sinusoidal or other regular waveform with the same frequency and with a fixed phase relationship to the input. For example, the basic excitation frequency for a dynamic wave analyzer might be derived by using a proximity pickup to monitor a mechanical movement such as shaft rotation. Commonly the signal derived by this means consists of a repetitive but irregular pulse waveform that must be converted to sinusoidal form before it can be used in the analyzer circuitry. Whereas many waveform converting circuits exist for transforming a particular input waveform at one frequency to a selected output waveform, prior circuits are not capable of tracking input frequency variations over wide ranges or of operating wide a wide variety of input waveforms.

Therefore, it is an object of the present invention to provide an electronic frequency multiplier circuit for generating any desired multiple or sub-multiple of an input frequency variable over a wide dynamic range.

Another object of the present invention is to provide an improved frequency multiplier circuit for generating a sinusoidal output signal in response to an input signal frequency varying over a wide range, wherein the ratio between the output signal frequency and the input signal frequency is selectively variable over a continuous range of values.

A further object of the present invention is to provide a frequency multiplier circuit for generating an output signal frequency at a given ratio to an input signal frequency as the input signal frequency is varied over a wide range.

Yet another object of the present invention is to provide an improved frequency multiplier circuit for generating an output frequency that automatically follows changes in the input frequency using a phase responsive servo technique which accurately maintains a given whole number frequency multiplication ratio and a given phase lock relationship between the input and output signals.

Still a further object of the present invention is to provide a circuit capable of operating with a variety of repetitive input waveforms to generate a sinusoidal or other regular waveform having a frequency directly proportional to the variable input frequency.

Still another object of the present invention is to provide a circuit for converting an irregular reptitive input waveform into a sinusoidal output with the same frequency and a fixed phase relative to the input.

These and other objects are accomplished in accordance with this invention by providing a unique waveform converter circuit incorporating a frequency to direct current converter circuit which generates a DC voltage proportional to the frequency of the input signal which is then applied through a switching circuit to control the charging and discharging rate of an integrator circuit between upper and lower amplitude limits. The integrator circuit produces a fixed amplitude triangular wave output signal with a variable frequency inversely proportional to the integration rate. When the output of the integrator circuit charges to the upper limit, the switching circuit responds to reverse the polarity of the applied DC voltage to begin discharging the integrator circuit. The time required for the integrator circuit to charge and discharge between the upper and lower limits determines the output frequency, and the integration rate is directly proportional to the amplitude of the applied DC voltage supplying charging and discharging current to the integrator circuit. The ratio between the input and output frequencies can be varied by changing the integration rate resulting from an applied DC voltage level.

In accordance with one particular embodiment of this invention, the input signal triggers a one-shot multivibrator once each cycle to generate a constant width, constant amplitude output pulse. A low pass filter with a fixed integration time converts the pulses generated by the multivibrator to a DC voltage with an amplitude directly proportional to the frequency of the input signal. This DC voltage applied through an appropriate bilevel switching mechanism charges and discharges an operational integrator circuit between fixed upper and lower levels. A variable resistor connected in series between the switch and the input to the integrator circuit can be set to control the rate of charging and discharging produced by an applied DC voltage level so that the ratio between the input and output frequencies can be selectively varied.

An appropriate sine wave shaping circuit with a wide frequency range can be used to convert the triangular output waveform obtained from the integrator circuit to a sinusoidal waveform for use in other circuitry. With the sine wave shaper circuit and the ability to receive a variety of input signal waveforms, the basic circuit in accordance with the invention can be used to convert an irregular input waveform of varying frequency to a sinusoidal output with a frequency corresponding to the input frequency.

In accordance with another aspect of this invention, a phase tracking function can be included to accurately maintain whole number multiplication ratios between the input and output frequencies and to achieve a particular phase-lock relationship between the input and output signals. A voltage variable one-shoe multivibrator responsive to a particular portion of each input signal cycle operates to generate a constant amplitude pulse having a width that is constant percentage of each output cycle. To maintain the constant percentage pulse width, the DC voltage from the low pass filter is used to control the voltage variable one-shot multivibrator. The pulses generated are timed to occur at approximately the same time that the switching circuit reverses the input polarity to the integrator. Each pulse is summed with the alternating square wave output from the bilevel switching circuit to increase rate of charging prior to the polarity reversal of the square wave and decrease it subsequent to the polarity reversal. If the input and output signals have the proper phase relation, some of the pulse occurs prior to and some occurs subsequent to the polarity reversal thus initially increasing one slope and then immediately decreasing the other slope so that no overall change in the relative phase of succeeding cycles of the triangular output wave results. However, if the phase relationship is not correct, then the pulse changes one slope more than the other to shift the phase of succeeding output cycles towards the desired phase coincidence. In this way, any whole number ratio between the input and output frequencies can be maintained even though the variable resistor setting be slightly off. In addition, this phase servoing action permits the frequency multiplier circuit to respond more quickly to changes in the input frequency.

These and other aspects of the invention may best be understood and appreciated by referring to the following detailed description taken in conjunction with the accompanying drawings, in which.

Figure 1:
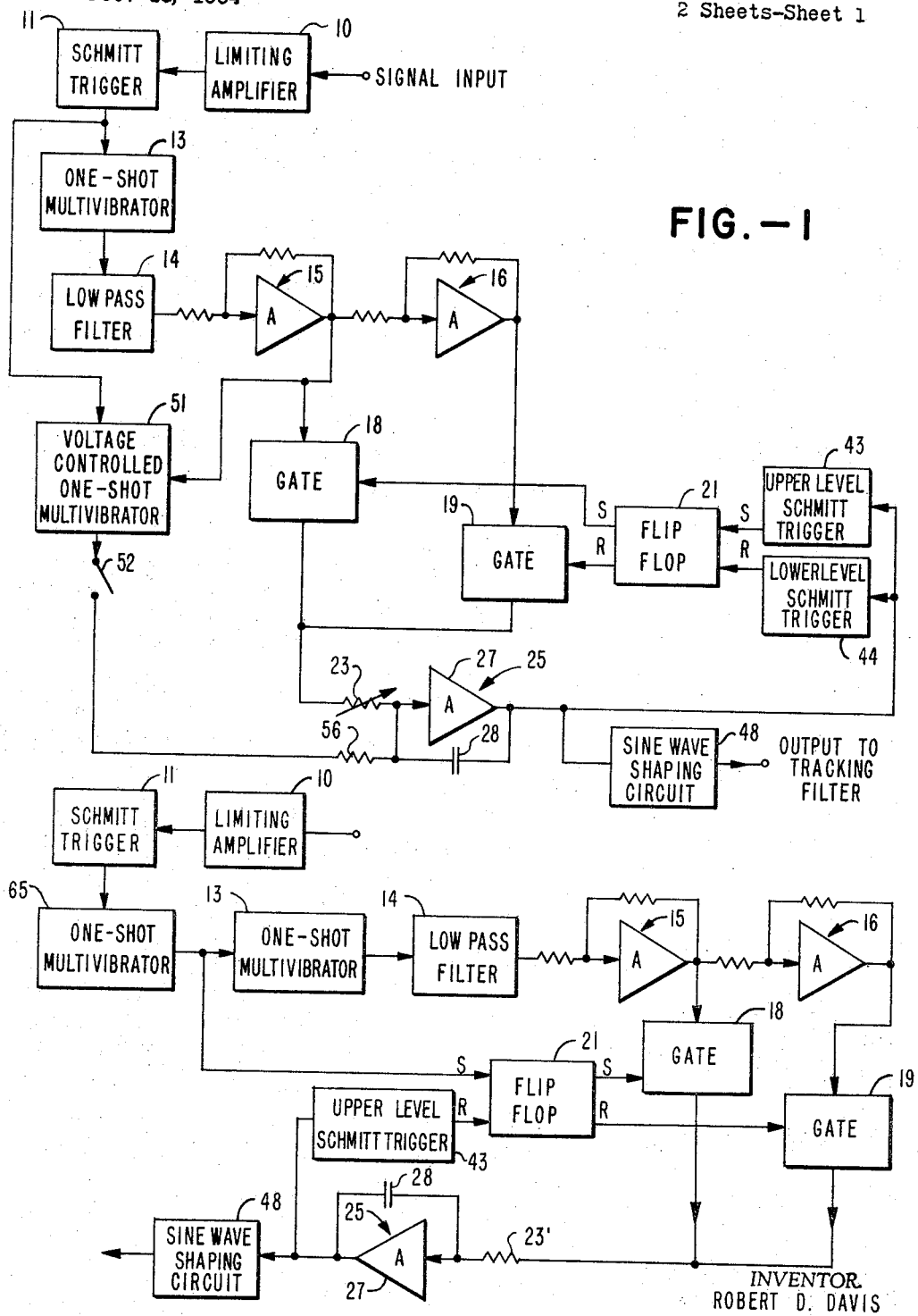
FIG. 1 is a schematic diagram shown partially in block diagram form illustrating a preferred embodiment of a frequency multiplier circuit in accordance with the invention.

Referring now to FIG. 1, a preferred embodiment of a frequency multiplier circuit in accordance with the invention is shown connected for operation in its normal mode, which permits any ratio between the input and output frequencies to be selected from within a given value range. The alternating input signal, which need not be symmetrical about a zero axis, is initially conditioned to produce a standard signal waveform that permits one of the zero axis crossings to be accurately determined. For this purpose, an amplitude limiting amplifier 10 first accentuates the zero crossings by eliminating most other portions of the signal, and then an amplitude or level responsive bistable circuit, such as a Schmitt trigger 11, generates a fixed amplitude output whenever the applied signal exceeds the zero level. The conditioned signal thus has only two amplitude levels with very fast rise and fall times at the zero axis crossings of the input signal.

A one-shot multivibrator 13 is triggered to generate a pulse at one or more points during each input signal cycle. In this particular embodiment, the one-shot multivibrator 13 is designed to be triggered only for the positive zero axis crossing of the conditioned input signal. The pulses generated by the one-shot multivibrator 13, which have a constant pulse width and amplitude, are then integrated by a low pass filter 14 having an integration period to produce a DC voltage level directly proportional to the frequency of the input signal.

A pair of operational amplifiers 15 and 16 operate as inverting scaler amplifiers to convert the DC voltage level from the low pass filter 14 into properly proportioned DC voltages of opposite polarity and equal amplitude. The first operational amplifier 15 amplifies and inverts the positive DC voltage received from the low pass filter 14. The resulting negative DC voltage is then applied to the input of a switching gate 18 and also to the second operational amplifier 16 which simply inverts the input to produce a positive DC voltage having the same amplitude to be applied to the input of a second switching gate 19. The set and reset outputs from a flip-flop circuit 21 control the alternate opening and closing of the switching gates 18 and 19, respectively. As the switching gates 18 and 19 open, they pass the positive and negative voltage inputs to charge and discharge an operational integrator circuit 25 through a resistor 23. The operational integrating amplifier 25 commonly consists of a DC inverting amplifier circuit 27 having a capacitor 28 connected in parallel between its input and output. The set output of the flip-flop 21 opens the gate 18 to pass the negative DC voltage that charges the integrator circuit 25 at a constant rate in the positive direction. Conversely, the reset state of the flip-flop 21 opens the gate 19 to pass the positive DC voltage that discharges the integrator circuit 25 at the same rate in the negative direction.

Figure 2:
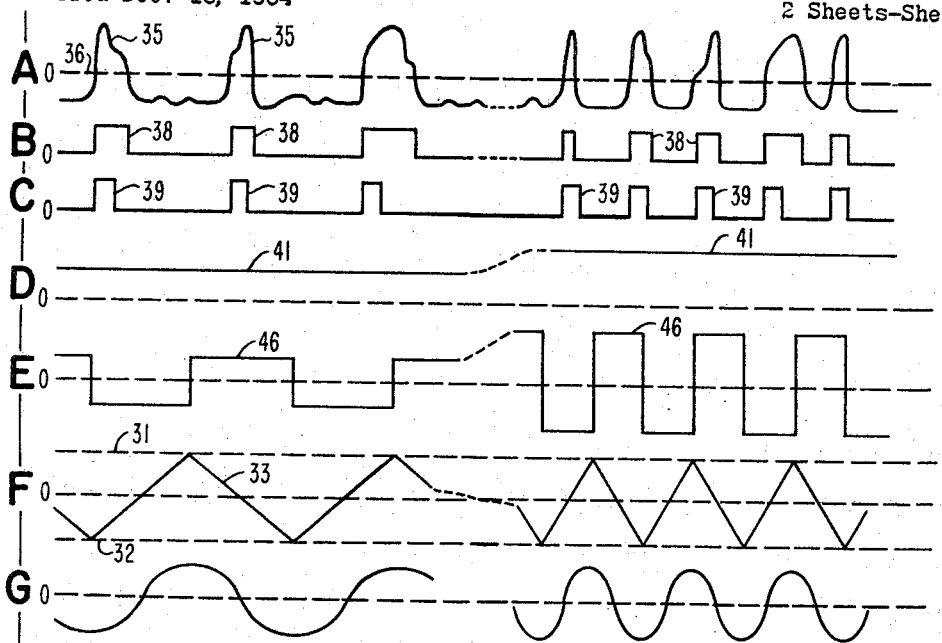
FIG. 2 is an idealized waveform diagram illustrating signals occurring at various points in the frequency multiplier circuit shown in FIG. 1 during its operation in a normal mode.

As shown by waveform F in the waveform diagram of FIG. 2, the alternate charging and discharging of integrator circuit 25 between upper and lower fixed levels 31 and 32 produces a triangular wave output signal 33 having a frequency proportional to the input frequency. The positive slope of the triangular wave 33 during charging equals the negative slope during discharging since the positive and negative voltages cause equal but opposite current flows through the resistor 23. The integration rate in either direction thus depends on the applied DC voltage level and the resistance value of the resistor 23 and the capacitance value of capacitor 28. The time required for charging or discharging between the two fixed levels 31 and 32 is inversely proportional to the applied DC voltage level so that the frequency of the triangular output wave 33 is directly proportional to the frequency of the input signal.

This relationship is graphically illustrated in the waveform diagrams of FIG. 2 for two different input frequencies. Waveform A of FIG. 2 shows an unsymmetrical input waveform with periodic positive excursions 35 that exceed a preselected triggering level 36. After being amplitude limited by the limiting amplifier 10, each positive excursion 35 fires the Schmitt trigger 11 as the input signal exceeds the preselected zero triggering level 36. The Schmitt trigger 11 remains on until the signal again falls below the triggering level 36 to generate the waveform B consisting of a series of constant amplitude, but variable width pulses 38. The one-shot multivibrator 13 responds to the leading edge of each pulse 38 to generate a pulse 39 of fixed amplitude and duration as shown in waveform C. The low pass filter 14, which has an extended integration period compared with the duration of the pulses 39, produces a DC voltage level directly proportional to the number of multivibrator pulses 39 occurring within the fixed integration period and thus directly proportional to the input frequency.

Waveform E illustrates the bilevel charging and discharging signal 46 applied from the operational amplifiers 15 and 16 to the integrator circuit 25 by operation of the switching gates 18 and 19. A feedback circuit, including a pair of Schmitt trigger devices 43 and 44 connected to receive the output signal from the integration circuit 25, controls the bilevel switching operation. The Schmitt trigger 43 fires when the output from the integrator circuit 25 reaches the upper level 31 to switch the flip-flop 21 to its set state, whereas the other Schmitt trigger 44 fires when the integrator output reaches the lower level 32 to switch the flip-flop 21 to its reset state. As the Schmitt triggers 43 and 44 alternately set and reset the flip-flop 21, the gates 18 and 19 open and close to apply the square wave signal 46 to the input of the integration circuit 25. As shown by the waveform E, the amplitude of this bilevel square wave signal 46 is directly proportional to the input frequency, and its repetition rate depends upon the slope of the triangular wave output 33. It should be understood that the switching function performed by the gates 18 and 19 may be accomplished by any conventional bilevel transfer switching arrangement such as a simple solenoid actuated two-position relay switch operated by the flip-flop 21.

Obviously, the integration rate of the integrator circuit 25 can be changed by varying the resistance value of the variable resistor 23 to control the flow of charging current to the integrator circuit 25. Any resistance value can be selected to maintain a desired multiplication factor between the input and output frequencies. Therefore, if the resistance of the variable resistor 23 is made variable over a continuous value range so may the frequency multiplication factor. Of course, the ratio between input and output frequencies can also be selectively varied by changing the gain of the amplifier 27 or the capacitive value of the capacitor 28.

In most cases, the triangular output wave obtained from the integrator circuit 25 should be converted into an appropriate waveform for use in other circuitry such as tracking filter or wave analyzer, as previously discussed. For example, an appropriate sine wave generator 48 can be used to convert the triangular output wave to a relatively distortionless sine wave at the same frequency. In particular, a diode wave shaping network can be used to break the triangular wave at appropriate points to approximate a sine wave with constant peak-to-peak amplitude. A particularly useful sine wave generator of this type has been described in detail in U.S. Patent No. 2,748,278, issued to O. J. M. Smith on May 29, 1956.

The normal mode of frequency multiplier operation described hereinabove in connection with FIGS. 1 and 2 enables any frequency ratio within a given range to be selected. Once chosen the selected frequency ratio is automatically maintained as the input frequency varies over a wide range. Typically frequency multipliers constructed in accordance with this invention have been designed to operate with input frequencies varying over any selected decade frequency range. The multiplication factor is selectable at any point in a continuous range of values up to one thousand times the lowest value. Thus the highest output frequency can be as much as ten thousand times the lowest output frequency. In contrast, a conventional voltage controlled oscillator, frequency divider or multiplier circuit or the like seldom has an output frequency range of more than a few times the lowest frequency.

Generally the input circuitry including the one shot multivibrator 13 and the low pass filter 14 should be designed to provide linear frequency to DC conversion over the entire range of input frequencies. The remainder of the frequency multiplier circuit which constitutes a constant amplitude triangular waveform generator is designed so that the output frequency is proportional to the DC voltage produced by the frequency to DC conversion. The ability of the frequency multiplier to track a changing input frequency depends upon the response time of the frequency to DC converter which is in turn determined by the cutoff frequency of the low pass filter 14. Accordingly, the tracking rate of the multiplier circuit is a function of the input frequency range.

In addition, this frequency multiplier circuit may use a phase servoing technique to achieve very accurate control of any desired whole number frequency ratio while also improving the tracking rate. This may be referred to as the integer following mode of operation and is illustrated by the waveforms of FIG. 3.

In this mode a switch 52 is closed to connect the output of a voltage controlled one-shot multivibrator 51 to the input to the integrator circuit 25. As shown in FIG. 3, the voltage controlled one-shot multivibrator 51 generates a pulse 54 coincident with the positive zero crossing of the input signal, which in this case is shown as a symmetrical sine wave in wave form A of FIG. 3. The conditioned signal which appears at the output of the Schmitt trigger 11 is shown in waveform B.

In operation the DC voltage from the operational amplifier 15 is applied to control the width of the pulses generated by the voltage controlled one-shot multivibrator 51 so that they remain a constant percentage of the output cycle as the input frequency is varied. The pulse width is kept quite narrow with respect to the period of the triangular wave output in order to minimize distortion. The pulses are fed through a summing resistor 56 to be combined with the bilevel signal (shown in waveform B) applied from the switching gates 18 and 19 through the variable resistor 23 to the input of the integrating circuit 25. The resulting signal 58 applied to the integrating circuit 25 is shown in waveform E of FIG. 3.

Figure 3:
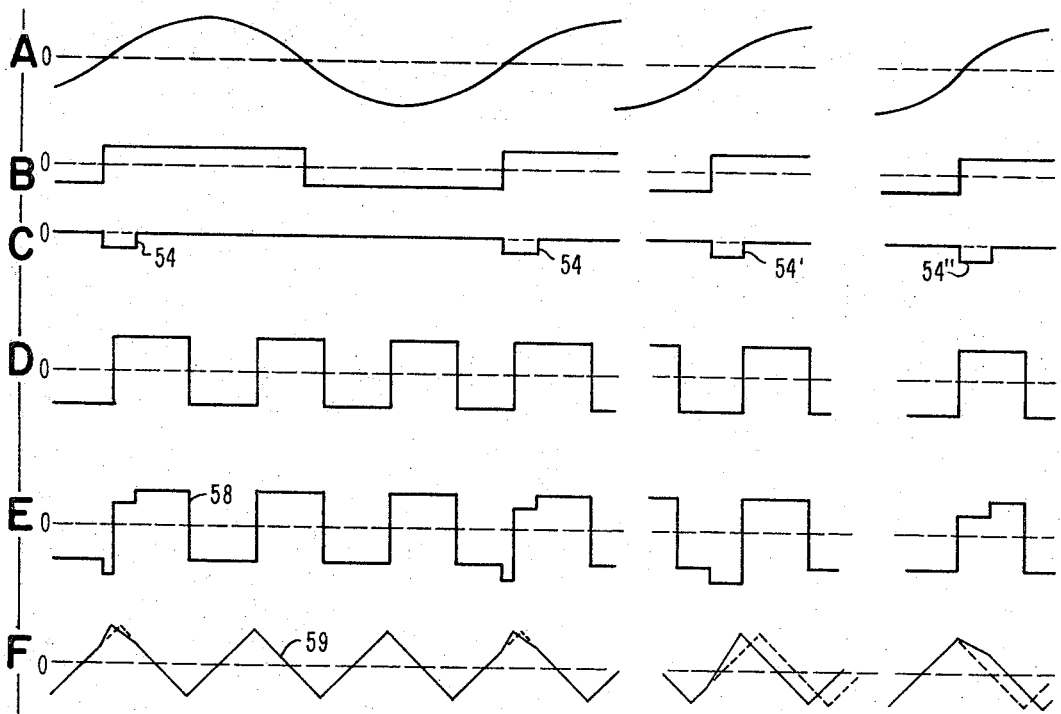
FIG. 3 is another idealized waveform diagram illustrating the phase servoing mode of operation for the frequency multiplier circuit shown in FIG. 1; and, FIG. 4 is a schematic diagram shown partially in block diagram form illustrating a preferred embodiment a waveform converter circuit in accordance with the invention.

The purpose of this phase lock servoing technique is to maintain a definite phase relationship between the input and output signals so that the pulse 54 is generated with its center roughly coincident with the change of polarity in the bilevel signal shown in waveform B of FIG. 3, which is obtained from the switching gates 18 and 19; that is, the pulse 54 should be centered with the peak of the triangular output wave where the integrator circuit 25 switches over to stop charging and start discharging. That portion of the pulse 54 occurring before the polarity change increases the amplitude of the charging signal, while that portion occurring after the polarity change is subtracted from the amplitude of the discharging signal as shown in waveform E. Thus the increased charging signal speeds up the integrator so that the polarity change occurs sooner than normal, whereas that portion of the pulse occurring after switchover slows down the integrator so that the next polarity change is delayed. When the proper phase lock relation is maintained, the switchover occurs approximately midway through the pulse 53 so that the increased charging rate prior to switchover is immediately followed by a decreased discharging rate thus causing no overall phase shift in succeeding cycles of the output signal in spite of the fact that this one peak of the triangular wave occurs slightly sooner than normal.

The next group of waveforms to the right in FIG. 3 illustrates a condition in which the phase of the output signal leads with respect to the phase relationship desired with the input signal. In this case, the pulse 54' is shown occurring in its entirety prior to the switchover. Thus the entire pulse 54' is added to increase the charging rate prior to switchover without a corresponding decrease in the rate of discharge occurring afterwards. Succeeding cycles of the triangular output wave are thus shifted toward the desired phase relationship. Conversely, in the third set of waveforms shown in FIG. 3, the pulse 54" occurs in its entirety subsequent to switchover, in which case the discharging rate decreases so that subsequent output cycles are shifted toward the desired phase relationship.

Accordingly, even if the setting of the variable resistor 23 is not exact, the phase lock servoing operation can be increased by increasing the amplitude or duration of the pulses 54. However, since very accurate setting can be achieved with most rheostats used for the variable resistance 23, the amplitude and duration of the pulse 54 should be kept to a minimum so that the distortion of the triangular waveform occurs only at the peak and has little or no effect upon the sine wave output signal.

One of the most important features of this invention is its ability to operate with a wide variety of repetitive input signals to produce a sine wave output with a frequency corresponding to that of the input signal. The waveform of the input signal received need not be symmetrical or have any particular regular pattern so long as it has repetitively occurring axis crossings that are readily identifiable. This feature is particularly useful, for example, where the input signal is derived from a proximity type pickup device positioned to sense mechanical motion such as shaft rotation. In this case the resulting input signal would consist of irregularly shaped pulses occurring at a repetition rate indicative of the shaft speed.

Because of its ability to accept a wide variety of irregular repetitive input signals, the basic circuit illustrated in FIG. 1 can be used as a waveform converter for converting an irregular waveform input signal to a sinusoidal or other regular waveform at the exact frequency of the input signal. When used in this manner, the circuit may be simplified as shown in FIG. 4 so that the output waveform can be maintained at th exact frequency of the input signal and in fixed phase relationship with the input signal.

Referring now to FIG. 4, the basic circuit components corresponding to those shown in the frequency multiplier arrangement of FIG. 1 are identified by the same reference numerals. The limiting amplifier 10 and the Schmitt trigger 11 condition the irregular input signals in the manner previously described so that the positive zero crossings are sharply defined. The conditioned input signal then triggers a one-shot multivibrator 65 to generate a very short duration pulse or spike coincident with each positive zero axis crossing of the input. As will hereinafter be described more fully, the short duration pulses from the one shot multivibrator 65 are used to control the bilevel switching action of the switching gates 18 and 19 in order to maintain the desired phase lock between the input and output signals.

The short duration pulses from the multivibrator 65 are also applied to trigger the one-shot multivibrator 13 which generates the pulses of constant amplitude and width to be integrated by the low pass filter 14. The output from the low pass filter 14 is amplified to the appropriate scale and inverted by the operational amplifiers 15 and 16 in the manner previously described to provide equal positive and negative voltage levels proportional to the input frequency to the inputs of the switching gates 18 and 19. The set and reset outputs from the flip-flop 21 control the alternate opening and closing of the gates 18 and 19 to generate a bilevel signal for alternately charging and discharging the operational integrator circuit 25. Because the waveform converter circuit operates with a fixed one-to-one ratio between the input and output frequencies, an appropriately valued fixed resistor 23' can be used instead of a variable resistor to set the integration rate of the integrator circuit 25.

As in the embodiment of FIG. 1, the upper level Schmitt trigger 43 fires when the integrator output reaches an upper fixed level to generate a short duration pulse for resetting the flip-flop 21. The reset output from the flip-flop 21 opens the gate 19 as the gate 18 is closed to reverse the polarity of the DC voltage applied to the operational integrator 25 so that the integrating capacitor 28 starts discharging. In this circuit, however, no lower level trigger is used, and the discharge continues until a short duration pulse from the one-shot multivibrator 65 switches the flip-flop 21 to its set state to close the gate 19 and open the gate 18 to begin charging again. By this means the negative peak of the triangular wave at the output of the operational integrator 25 is made coincident with the positive zero axis crossing of the input signal so that input and output signals are maintained in fixed phase relation with one another. The additional one shot multivibrator 65 is used to generate a short duration switching signal which is similar to that generated by the upper level Schmitt trigger 43 for resetting the flip-flop 21.

The circuit values are chosen so that the time required for charging to the upper level established by the Schmitt trigger 43 is exactly one-half of the input signal cycle. As the input frequency changes so does the charging signal in direct linear proportion thus maintaining this relationship. This in effect establishes a lower limit so that each pulse from the one shot multivibrator 65 occurs as the output from the operational integrator 25 reaches this lower limit.

The ability of this circuit to track a changing input frequency is a function of the response time of the input frequency to DC conversion accomplished by the multivibrator 13 and the low pass filter 14. The cutoff frequency of the low pass filter 14 determines the maximum response rate so that the frequency tracking ability depends on the lowest input frequency for which the circuit is designed. If the frequency change occurs too rapidly, the DC voltage level from the low pass filter 14 does not have enough time to change proportionately. When the DC voltage level generated is not within several percent of the proper DC voltage for the existing input frequency, the amplitude of the triangular wave output of the operational integrator circuit 25 changes, but normally the triangular wave output has a constant amplitude for all input frequencies within the desired frequency range. Accordingly, the sine wave obtained from the sine wave shaping circuit 48 has a constant amplitude with a frequency equal to the repetition rate of the irregular input waveform. Irrespective of the input waveform, the sine wave output normally has less than two percent harmonic distortion using presently available sine shaping networks.

Although preferred embodiments of this invention have been described and illustrated herein, it will be understood that various changes, modifications and equivalent arrangements may be employed without departing from the scope of the invention as expressed in the appended claims.

What is claimed is:

1. A circuit for generating a selected output waveform with a frequency proportional to the variable repetition rate of an input signal comprising: means for generating a DC voltage level proportional to the repetition rate of the input signal; and integrator circuit for integrating an applied voltage in linear fashion at a rate proportional to its amplitude; and means for applying the DC voltage level generated to the integrator circuit to charge and discharge between fixed upper and lower output levels thereby generating a triangular waveform with a frequency proportional to the repetition rate of the input signal.

2. A circuit for generating an output waveform with a frequency proportional to the variable repetition rate of an input signal comprising: means for generating a DC voltage level proportional to the repetition rate of the input signal; and integrator circuit; switch means for applying the DC voltage level to charge and discharge the integrator circuit at a linear rate proportional to the DC voltage level; and means responsive to the output of the integrator circuit for controlling said switch means to charge the integrator circuit to a first level and then discharge the integrator circuit for an equal period of time until its output reaches another level to begin charging again.

3. A circuit for generating an output waveform with a frequency proportional to the repetition rate of an input signal having at least one regularly occurring axis crossing during each cignal cycle comprising: means for detecting each regularly occurring axis crossing; means responsive to said detecting means for generating a DC voltage level proportional to the repetition rate of the regularly occurring axis crossings; and triangular waveform generating means for producing a fixed amplitude triangular output wave with equal positive and negative slopes proportional to the DC voltage level.

4. A circuit for generating an output waveform with a frequency proportional to repetition rate of an input signal comprising an integrator circuit; means coupled to the integrator circuit output for establishing upper and lower fixed integration limits; and means responsive to said means for establishing limits for charging and discharging said integrator circuit between the upper and lower limits at a rate linearly proportional to the repetition rate of the applied input signal.

5. A frequency multiplier circuit for generating a selected output waveform with a frequency proportional to the variable repetition rate of an input signal comprising: means for generating a DC voltage level proportional to the repetition rate of the input signal; an integrator circuit for integrating an applied voltage in linear fashion; and means for applying the DC voltage level generated to charge and discharge the integrator circuit between upper and lower fixed limits at a selectable rate proportional to the amplitude of the DC voltage level, whereby a fixed amplitude triangular waveform is generated at a frequency determined by the selected charging rate.

6. A circuit for generating a selected output waveform with a frequency proportional to the variable repetition rate of an input signal having an identifiable axis crossing one each cycle comprising: means for generating a pulse of fixed amplitude and duration at each of the identifiable axis crossings; a low pass filter for integrating the pulses over a fixed integration interval to provide a DC voltage level proportional to the repetition rate of the pulses; an integrator circuit for integrating the DC voltage level generated in linear fashion at a rate proportional to its amplitude; bilevel switching means for repetitively reversing the polarity of the DC voltage level generated for alternately charging and discharging the integrator circuit; and means responsive to the output of the integrator circuit for establishing upper and lower fixed integration levels for controlling the switching means to charge the integrator to the upper level and then discharge the integrator for an equal interval of time until the output reaches the lower level to begin charging again.

7. A frequency multiplier circuit comprising: means for generating a DC voltage level proportional to the frequency of an applied input signal; an operational integrator circuit having a linear integration characteristic between upper and lower fixed levels; DC amplifier means for generating first and second equal amplitude DC voltages of opposite polarity proportional to the DC voltage level generated; first gating means coupling said first DC voltage to the input of the operational integrator circuit; second gating means coupling said second DC voltage to the input of the operational integrator circuit; a bistable circuit having a set and a reset state coupled to control the alternate opening and closing of the first and second gating means; means responsive to the output of the operational integrator circuit for placing the bistable circuit in its set state when the output reaches an upper level and for placing the bistable circuit in its reset state when the output reaches its lower level; and means coupling the outputs from the first and second gating means to alternately charge and discharge the operation integrator circuit between the upper and lower levels at a linear rate proportional to the frequency of the input signal.

8. The frequency multiplier circuit of claim 7 wherein said means coupling the first and second gates to the input of the operation integrator circuit includes variable impedance means for varying the charging and discharging rate of the operational integrator circuit to permit selection of the frequency ratio between the input and output signals.

9. A circuit for generating an output frequency proportional to the frequency of an applied input signal comprising: a linear integrating circuit; means for applying a voltage proportional to the frequency of the input signal to charge and discharge the integrator circuit; means responsive to the integrator circuit output for controlling the means for applying the voltage repetitively to charge the integrator circuit from a lower to an upper level and then discharge the integrator circuit from the upper to the lower level; and variable impedance means for selectively controlling the proportion of the voltage applied to charge and discharge the integrator circuit, thus varying the ratio between the output frequency and the input signal.

10. A circuit for generating a selected output signal waveform at a frequency which is a selected whole number multiple of the frequency of an input signal comprising: means for generating a DC voltage level proportional to the input signal frequency; an integrator circuit for integrating the DC voltage level at a linear rate; switching means for reversing the polarity of the DC voltage level for alternately charging and discharging the integrator circuit; means responsive to the output of the integrator circuit for controlling the switching means to repetitively charge the integrator from a fixed lower level to a fixed upper level and then discharge the integrator circuit from the upper level to the lower level; a voltage controlled monostable circuit responsive to the DC voltage level generated for producing a constant amplitude pulse having a duration which is a small fixed percentage of each output cycle, said pulse being generated at a fixed point during each input cycle; and summing means for adding the pulse to the DC voltage level applied at the input of the integrator circuit so that that portion of the pulse occurring before the polarity reversal increases the charging rate and that portion of the pulse occurring after the polarity reversal decreases the charging rate to maintain a fixed phase relation and whole number frequency ratio between the input and output signals.

11. A waveform converter circuit comprising: a circuit for identifying a selected axis crossing of a repetitive input signal; means for generating a pulse of constant amplitude and duration at each selected axis crossing identified; a low pass filter coupled to receive said pulses generated for producing a DC voltage level proportional to the repetition rate of the input signal; a linear integration circuit for integrating an applied DC voltage at a constant rate; switching means for applying the DC voltage level generated to repetitively charge and discharge the integrator circuit by reversing the polarity of the applied DC voltage; means responsive to the output of the integrator circuit for operating the switching means to begin discharging the integrator circuit when its output reaches an established upper level; and means responsive to each of said pulses for operating the switching means to reverse the polarity of the DC voltage level applied to begin charging the integrator circuit.

12. A waveform generating circuit for producing a signal with an output frequency proportional to the frequency of a cyclical input signal comprising: an integrator circuit; means for generating a first signal for charging the intergrator circuit at a rate proportional to the frequency of the input signal; means for generating a second signal for discharging the integrator circuit at a rate equal to the charging rate; and switch means responsive to the output of the integrator circuit for alternately applying the first and second signals to charge and discharge the integrator circuit thereby generating a triangular output waveform signal with a frequency proportional to the frequency of the input signal.

13. The waveform generating circuit of claim 12 wherein said switch means comprises: a first trigger circuit coupled to the output of the integrator circuit for applying said first signal when the output reaches a fixed lower level; and a second trigger circuit coupled to the output of the integrator circuit for applying said second signal when the output reaches a fixed lower level, whereby a triangular output waveform is generated with a fixed peak-to-peak amplitude between the upper and lower levels.

14. The waveform generating circuit of claim 12 wherein said switch means comprises: first trigger means responsive to a given point in each input signal cycle for applying the first signal to charge the integrator circuit; and second trigger means coupled to the output of the integrator circuit for applying said second signal to discharge the integrator means when the output reaches a fixed upper level.

15. The waveform generating circuit of claim 13 further comprising: a voltage control monostable circuit for generating a pulse of fixed amplitude, the first signal being used to control the duration of the fixed amplitude pulse at a fixed relatively small percentage of the output signal cycle; and means for summing the pulse with the first and second signals to be added to the first signal to increase the charging rate and subtracted from the second signal to decrease the discharging rate thereby tending to produce a phase shift in the triangular waveform output to maintain a desired phase relationship with the input signal.

16. In a waveform generator circuit for producing a symmetrical output waveform with a frequency proportional to the amplitude of an input signal, the circuit arrangement comprising: amplifier means consisting of first and second DC amplifiers for generating first and second DC voltages of equal amplitude and opposite polarity and with an amplitude proportional to the amplitude of the input signal; an operational integrator circuit having a linear integration characteristic between upper and lower fixed levels for producing an output; first gating means for selectively coupling said first DC voltage to the operational integrator circuit to cause it to charge at a constant rate proportional to the amplitude of said first DC voltage; second gating means for selectively coupling said second DC voltage to the operational integrator circuit for causing it to discharge at a constant rate proportional to the amplitude of said second DC voltage; and switching means responsive to the charging and discharging of the operational integrator circuit for generating a first gating signal when the output of said operational integrator circuit reaches the lower fixed level and for generating a second gating signal when said output reaches the upper fixed level, said first gating signal being applied to said first gating means to couple said first DC voltage to the operational integrator circuit, and said second gating signal being applied to said second gating means to couple said second DC voltage to the operational integrator circuit, the first and second gating means being operated alternately to apply said first and second DC voltages alternately to the operational integrator circuit to cause the output to charge and discharge between the upper and lower fixed level to produce a substantially symmetrical triangular waveform.

17. The circuit arrangement of claim 16 further comprising: waveform converter means coupled to the operational integrator circuit for converting the triangular waveform produced to approximate a sine wave having the same frequency as said triangular wave.

18. A circuit for generating an alternating output signal waveform with a selected phase relationship to a reference signal at a selected integral multiple or submultiple of the frequency of the alternating output signal waveform, comprising: means for generating a DC voltage level proportional to the desired frequency of the alternating output signal waveform; a linear integrator having an input connected to receive said DC voltage level and for producing an output representative of the integral of a voltage applied to the input; means responsive to the reference signal for generating a pulse at a fixed point during each cycle of the reference signal; and switching means responsive to the level of the output from said integrator circuit and the generation of said pulse for repetitively reversing the polarity of the DC voltage level and applying it to the input of said integrator circuit to maintain a fixed phase relationship and frequency ratio between the alternating output waveform and the reference signal.

19. The circuit of claim 18 wherein said switching means includes a bistable switching circuit for alternately reversing the polarity of the DC voltage level applied to the input of said integrator circuits; and means responsive to the level of the output from said integrator circuit to cause said bistable switching circuit to produce a first polarity reversal when said output reaches a fixed level, said pulse produced by said circuit means being coupled directly to said bistable switching circuit to produce a second polarity reversal at said fixed point during each cycle of the reference signal.

20. The circuit of claim 18 wherein said switching means is responsive to the level of the output from said integrator circuit for repetitively producing a first polarity reversal when the output of said integrator reaches a fixed upper level and a second polarity reversal when said output reaches a fixed lower level; and wherein said circuit means generates a constant amplitude pulse having a duration which is a small fixed percentage of each output cycle, said pulse being added to the DC voltage level applied to the input of said integator circuit to increase the rate of change of the output during that portion of said pulse occurring before a polarity reversal and to decrease the rate of change of the output during that portion of the pulse occurring after the polarity reversal, thus tending to maintain a fixed phase relationship and frequency ratio between the alternating output waveform and the reference signal.

21. A circuit for generating an alternating output signal waveform with a selected phase relationship to a reference signal having a frequency at a selected integral multiple or a sub-multiple of the frequency of the alternating output signal waveform, comprising: a linear integrator circuit having an input and an output representative of the integral of a voltage applied to the input; means for providing a DC voltage level proportional to the desired frequency of the alternating output signal waveform to be applied to the input of said integrator circuit; circuit means responsive to the reference signal for generating at a fixed point during each cycle of the reference signal a constant amplitude pulse having a duration which is a small fixed percentage of each output cycle; and summing means for adding the pulse generated to the DC voltage level applied to the input of said integrator circuit to increase the rate of change of the output during that portion of the pulse occurring before a polarity reversal and decrease the rate of change of the output during that portion of the pulse occurring after the polarity reversal, thereby tending to maintain a fixed phase relationship and frequency ratio between the alternating output waveform and the reference signal; switching means responsive to the level of the output from said integrator circuit for repetitively reversing the polarity of the DC voltage level applied to the input of said integrator circuit when said output reaches a fixed upper level and when said output reaches a fixed lower level.

References Cited

UNITED STATES PATENTS

| | | | |
|---|---|---|---|
| 2,842,664 | 7/1958 | Martin | 307—88.5 X |
| 2,969,498 | 1/1961 | Stenudd | 307—88.5 |
| 3,168,658 | 2/1965 | Marshall | 307—88.5 |
| 3,219,935 | 11/1965 | Katakami | 307—88.5 |
| 3,256,426 | 6/1966 | Roth et al. | 328—127 X |

ARTHUR GAUSS, *Primary Examiner.*

J. ZAZWORSKY, *Assistant Examiner.*

UNITED STATES PATENT OFFICE
CERTIFICATE OF CORRECTION

Patent No. 3,350,651                        October 31, 1967

Robert D. Davis

It is hereby certified that error appears in the above numbered patent requiring correction and that the said Letters Patent should read as corrected below.

Column 3, line 1, for "wide a wide" read -- with a wide --; column 4, line 11, for "one-shoe" read -- one-shot --; column 7, line 50, for "pulse 53" read -- pulse 54 --; column 8, line 25, for "at th" read -- at the --; column 9, line 62, for "and" read -- an --; line 74, for "cignal" read -- signal --; column 10, line 31, for "one" read -- once --; column 11, line 61, for "intergrator" read -- integrator --.

Signed and sealed this 11th day of March 1969.

(SEAL)
Attest:

Edward M. Fletcher, Jr.                        EDWARD J. BRENNER

Attesting Officer                              Commissioner of Patents